United States Patent [19]
Ott et al.

[11] Patent Number: 5,212,983
[45] Date of Patent: May 25, 1993

[54] AIR FLOW SENSOR AND DETECTING METHOD

[75] Inventors: James H. Ott, Akron; Mark E. Anglin, Wadsworth, both of Ohio

[73] Assignee: Novar Electronics Corporation, Barberton, Ohio

[21] Appl. No.: 671,090

[22] Filed: Mar. 18, 1991

[51] Int. Cl.$^5$ .................................. G01F 1/68
[52] U.S. Cl. ....................... 73/204.15; 73/204.14
[58] Field of Search .......... 73/204.14, 204.15, 204.25

[56] References Cited

U.S. PATENT DOCUMENTS

| | | | |
|---|---|---|---|
| 2,552,017 | 5/1951 | Schwartz | 73/204.15 |
| 2,650,496 | 9/1953 | Middleton et al. | 73/204.15 |
| 2,726,546 | 12/1955 | King, Jr. | 73/204.15 |
| 3,363,462 | 1/1968 | Sabin | 73/204.15 |
| 3,595,079 | 7/1971 | Grahn | 73/204.15 |
| 4,059,982 | 11/1977 | Bowman | 73/204.15 |

FOREIGN PATENT DOCUMENTS

0158562 12/1980 Japan .................. 73/204.15

Primary Examiner—Herbert Goldstein
Attorney, Agent, or Firm—Frank H. Foster

[57] ABSTRACT

A pair of thermistors are mounted in a tube which diverts a minor portion of the air flowing through a duct of an HVAC system. One thermistor is heated by a feedback control system to maintain a substantially constant temperature differential between the thermistors. A signal representing the flow velocity is detected by detecting the power which is applied to the heating body to maintain the constant differential. That power represents the thermo power being carried away from the heated body. The temperature of the unheated thermistor is also detected. The signals are converted to digital form and applied to a computer for computing the flow rate in the ducts.

2 Claims, 6 Drawing Sheets

AIR FLOW SENSOR AND DETECTING METHOD

TECHNICAL FIELD

This invention relates generally to environmental monitoring and control and more particularly relates to an electronic circuit and method for measuring air flow rate, which is particularly useful in modern computer controlled heating, ventilating, and air conditioning systems.

BACKGROUND ART

Modern heating, ventilating, and air conditioning (HVAC) systems may be computer controlled in order to maximize comfort and minimize cost and energy consumption. Computer control permits the temperature of and air flow rate to different areas within a building to be tailored to the specific needs required by the different building areas and the changes in those needs in accordance with a daily and weekly schedule. A building management system designed for this purpose typically has a central computer which is controlled by an operator, a plurality of remotely controlled HVAC system components, such as dampers and fans, and a plurality of remote sensors, such as temperature, humidity, and air flow sensors.

The present invention is directed to an improved sensor for detecting a signal representing the flow rate of air at a particular location within a duct in the HVAC system.

The prior art has shown various sensors for accomplishing this function. One of the first sensors utilized the Pitot tube system, in which a small, elongated tube extends into the air stream of a duct with its open end pointing upstream. Its opposite end is closed by a static pressure sensor. The Pitot tube system measures a static pressure within the tube which is an increasing, continuous function of the air flow rate within the duct.

Because such a system detects stair pressure it describe air flow rate in terms of a pressure or pressure differential, commonly in units of inches of water. Such prior art systems develop electrical signals which are a function of the static pressure. In order for a newer sensor to be compatible and therefore replace an earlier sensor, the subsequent sensors also develop signals which are based upon the units of inches of water.

In computer control systems, information is stored in the computer for each remote sensor and its local conditions. For example, the stored data would include both the cross-sectional areas of each duct where a flow rate detector is located and an algorithm for converting the signal from the flow rate detector to flow rate so that the air volume in cubic feet of air per minute flowing through a duct may be calculated and utilized in the control of the environment.

A more recently developed prior art system for detecting air flow rate in an HVAC system uses a small tube having its open, inlet end facing-upstream and an open outlet end located downstream of the inlet end and facing downstream. This tube contains a pair of electrical conductors, such as thermistors, one upstream of the other and located within the tube. One of these conductors is heated by applying a constant electrical power to it and the other conductor is not heated. Electronic circuitry attached to these conductors measures the impedance of each conductor and therefore detects a signal representing the temperature differential between the two conductors.

This prior art "hot wire" system operates on the theory that a small portion of the air stream is diverted through the tube and the flowing, diverted air stream causes a pressure differential as a result of the fluid flow resistance through the tube. The higher the fluid flow velocity through the tube the more heat is carried away from the heated wire in the flowing air, and therefore the more it is cooled toward the temperature of the unheated conductor. The more the heated wire is cooled the less is the temperature differential which is measured between the two conductors. Consequently, the temperature differential, which is measured by the electronic circuitry, is a function of the air flow rate in the duct and of the pressure differential between the ends of the tube.

While such a system works reasonably well at relatively smaller flow velocities, when the flow velocity becomes substantial, the heated wire is cooled so much that accuracy is lost and a low measurement resolution is the result. Consequently, such prior art systems have a relatively narrow range of accuracy. For example, they typically have a range of accuracy of 0.03-2.0 inches of water. Variations in the temperature of the air also have a substantial affect on the accuracy of the device.

However, in modern HVAC systems it is desirable to have the range extending from 0.01 inches of water to 4 inches of water.

There is, therefore, a need for an air flow sensor which can operate over the entire range of 0.01 to 4.0 inches of water and over a temperature range of 40° F. to 90° F. while providing resolution accuracy better than 0.01 inch of water.

BRIEF DISCLOSURE OF INVENTION

In the present invention a pair of bodies, preferably electrical conductors, such as thermistors, are positioned in the flowing fluid and one is heated, preferably by the output of a feedback control system, to maintain a preselected, substantially constant temperature differential between the two bodies. A signal representing the flow velocity is detected by detecting the power which is applied to the heated body to maintain the constant temperature differential, which power therefore represents the thermal power being carried away from the heated body. Thus, instead of applying a substantially constant heating power to the heated body and measuring the temperature, as was done in the prior art, the present invention applies a variable power by a feedback control system which maintains a substantially constant temperature differential and then measures the power applied to the heated body to maintain the constant temperature differential. The result is substantially enhanced accuracy and a broader range of accurate operation. In the preferred embodiment, the substantially constant temperature differential is approximated by maintaining a substantially constant impedance differential between two substantially identical thermistors.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

Figure 1:
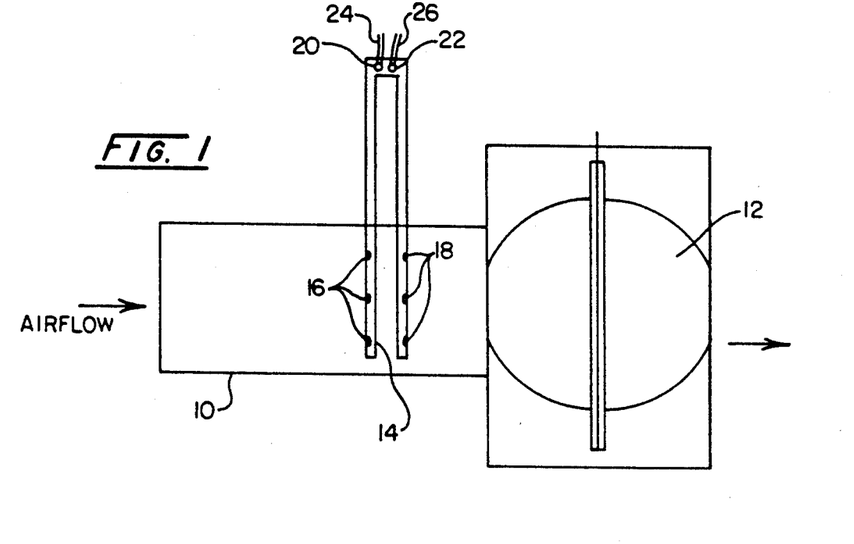
FIG. 1 is a diagram illustrating the physical positioning of the thermistors in association with the ventilating ducts and HVAC equipment.

FIG. 1 illustrates an HVAC duct 10 connected to a conventional damper 12 and provided with a conduit 14 for use with the detector of the present invention. The conduit 14 is a tube having a series of inlet openings 16, positioned upstream of a series of outlet openings 18. The inlet openings 16 preferably face upstream, while the outlet openings 18 preferably face downstream. This causes an air flow through the tube 4. A pair of thermistors 20 and 22 are located within the tube and have their electrical leads 24 and 6 extending from the tube to the electrical circuitry.

Figure 2:
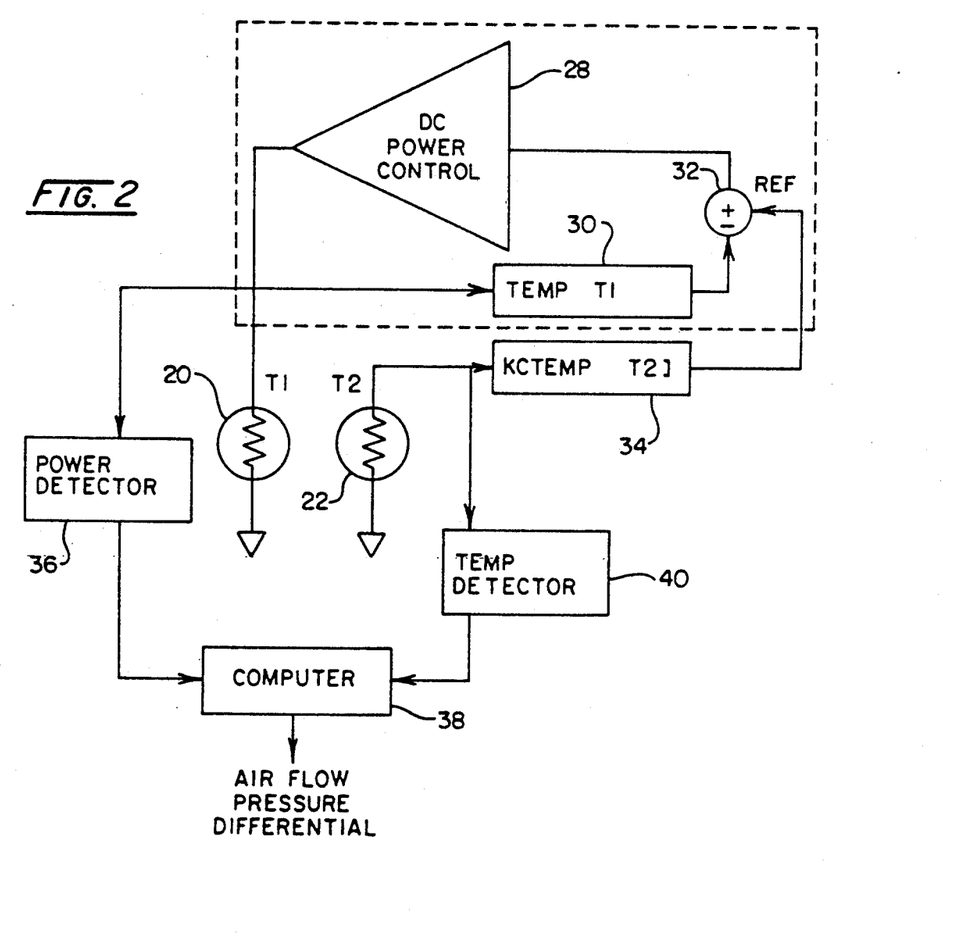
FIG. 2 is a simplified block diagram illustrating the principles of the present invention.

The electrical circuitry for the preferred embodiment is illustrated in simplified form in FIG. 2. The thermistors 20 and 22 are connected to a negative feedback control circuit 26, sometimes called a servo loop, which controls the heating of the thermistor 20.

As is well known to those skilled in the art, a feedback control system typically comprises a relatively high gain amplifier, the output of which is applied to control a device being controlled and the input of which is connected to a summing junction. Connected as an input to the summing junction is a negative feedback loop which feeds back a signal representing the controlled parameter of the device being controlled by the feedback control system. The other input to the summing junction is a reference signal. The difference between the feedback signal and the reference signal is applied to the high gain amplifier to control the control device.

In the present invention the temperature of thermistor 20 is controlled by amplifier 28 which heats the thermistor 20 in a manner to maintain a substantially constant temperature differential between the temperature of the thermistor 20 and the temperature of the thermistor 22. In the preferred embodiment, the feedback signal is a temperature signal applied to feedback loop 30 from the heated thermistor 20 to the summing junction 32. A reference signal is derived from a temperature signal for the thermistor 22. As is apparent to those of ordinary skill in the art, if the temperature signal from the thermistor 20 and the temperature signal of the thermistor 22 were both applied directly to the summing junction 32, the DC power control amplifier 28 would maintain the thermistor 20 at the same temperature as the thermistor 22.

In order to maintain a constant temperature differential rater than the same identical temperature, it is convenient in the preferred embodiment of the invention to apply a constant multiplier to the temperature signal of the thermistor 22. This constant multiplier is selected between 0 and 1 so that only a portion of the temperature signal from the thermistor 22 is applied as the reference. Since the thermistors have inverse temperature to impedance characteristics, this scaling of the temperature signal from the thermistor 22 by a constant less than 1 causes the feedback control system 26 to maintain the thermistor 20 at a temperature which is a constant differential above the temperature of thermistor 22. As a result, a temperature signal from the thermistor 22 is applied through a scaling circuit 34 to the summing junction 32 and used as the reference signal.

It will be apparent to those skilled in the art that the temperature signals could be applied directly to a differential amplifier with no scaling of the temperature signal from the unheated thermistor 22 and the differential output could be applied to the summing junction as the feedback control signal. A fixed reference voltage could then be applied to the summing junction to maintain a constant temperature differential using standard feedback control techniques. However, deriving the reference from the unheated thermistor simplifies and improves the circuitry.

Thus, it is the function of the feedback control circuit 26 and the temperature signal through the scaling circuit 34 to maintain the temperature of heated thermistor 20 at a fixed, constant selected temperature differential above the temperature of the unheated thermistor 22.

A power detector circuit 36 is also connected to the thermistor 20 for detecting an analog signal which represents the electrical power applied to the thermistor 20 and therefore represents the thermal energy per unit of time which is carried away by the air flow across the thermistor 20. This analog power signal is converted to digital format and applied to a computer 38. A temperature detector circuit 40 is connected to the unheated thermistor 22 to similarly detect a signal representing the temperature of thermistor 22. That temperature signal represents air temperature and is also converted to digital form and applied to the computer 38.

The power detected by the power detector 36 is a continuous increasing function of the air flow rate past the thermistors 20 and 22 and is also a function of the air temperature. Consequently, the computer is able to compensate for the air temperature and compute the air flow rate is the manner discussed in more detail following a description of the preferred embodiment.

Figure 3:
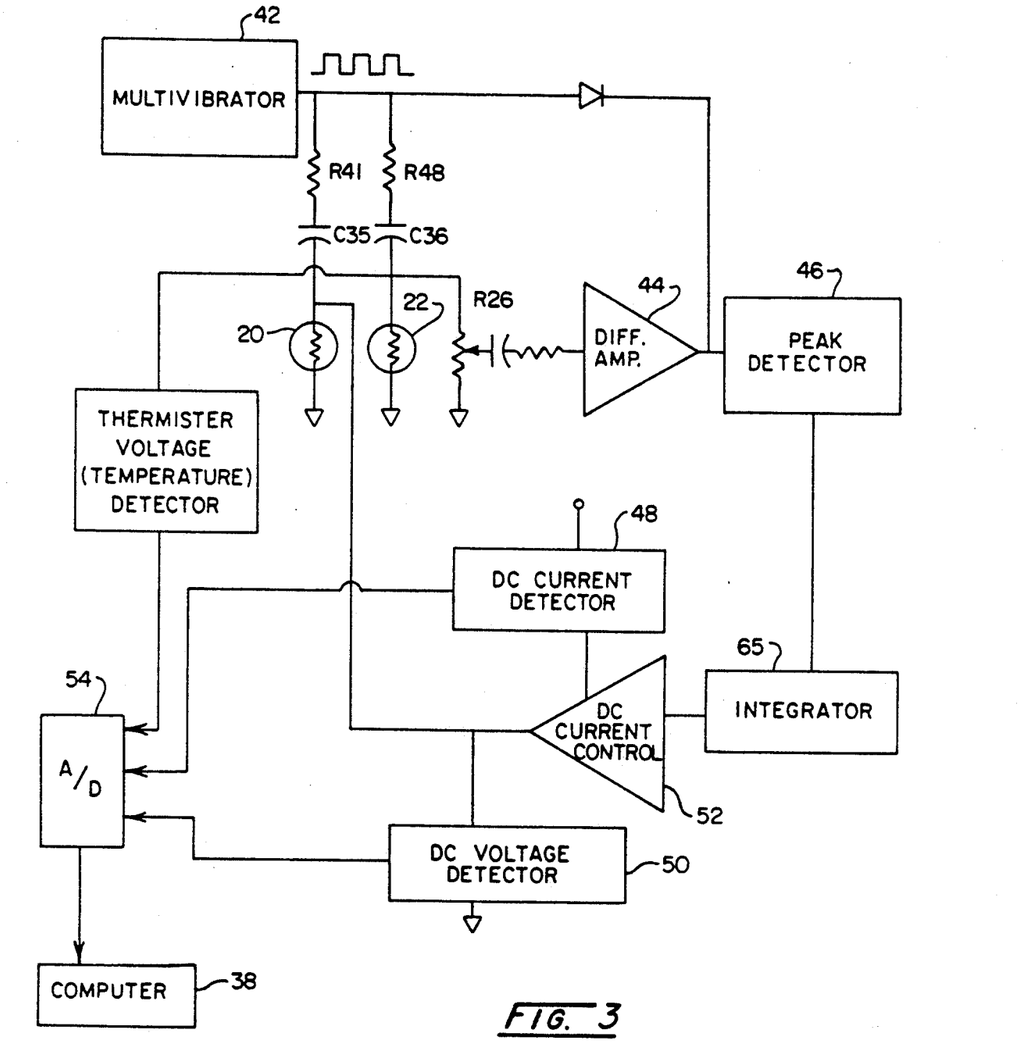
FIG. 3 is a more detailed block diagram illustrating the principles of operation of the preferred embodiment of the invention.
Figure 4A:
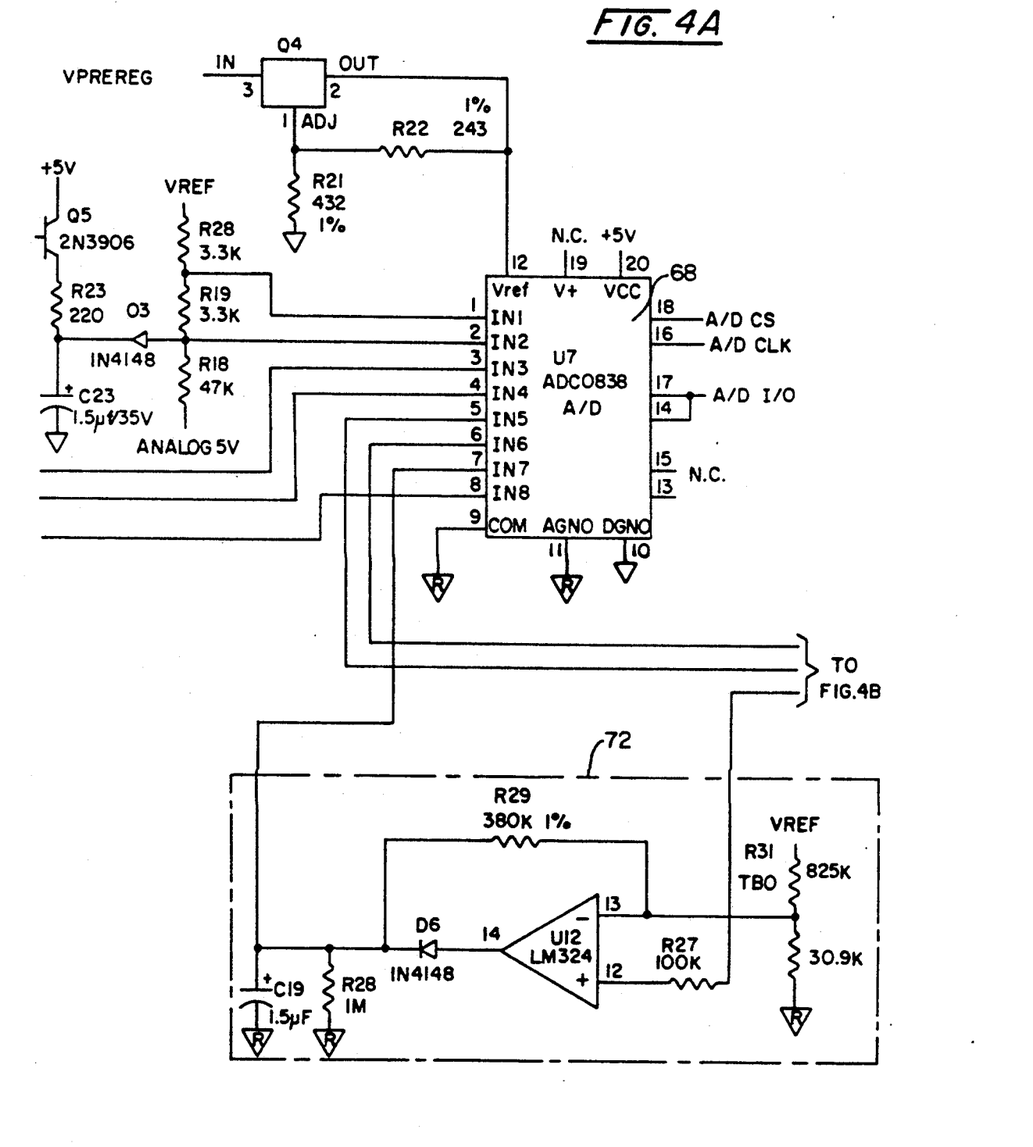
FIGS. 4A-4C are a schematic diagram of the preferred embodiment of the invention.
Figure 4B:
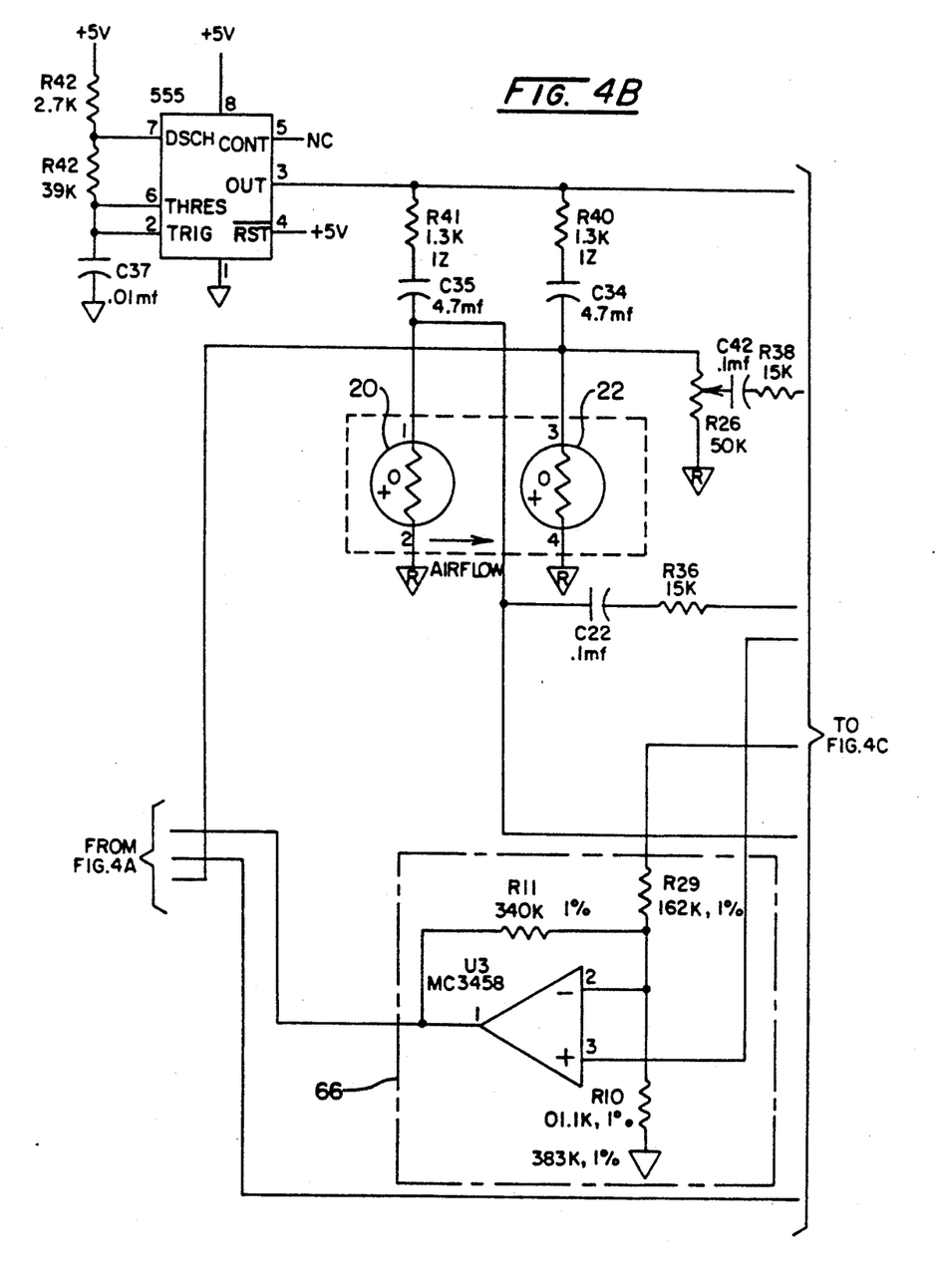
Figure 4C:
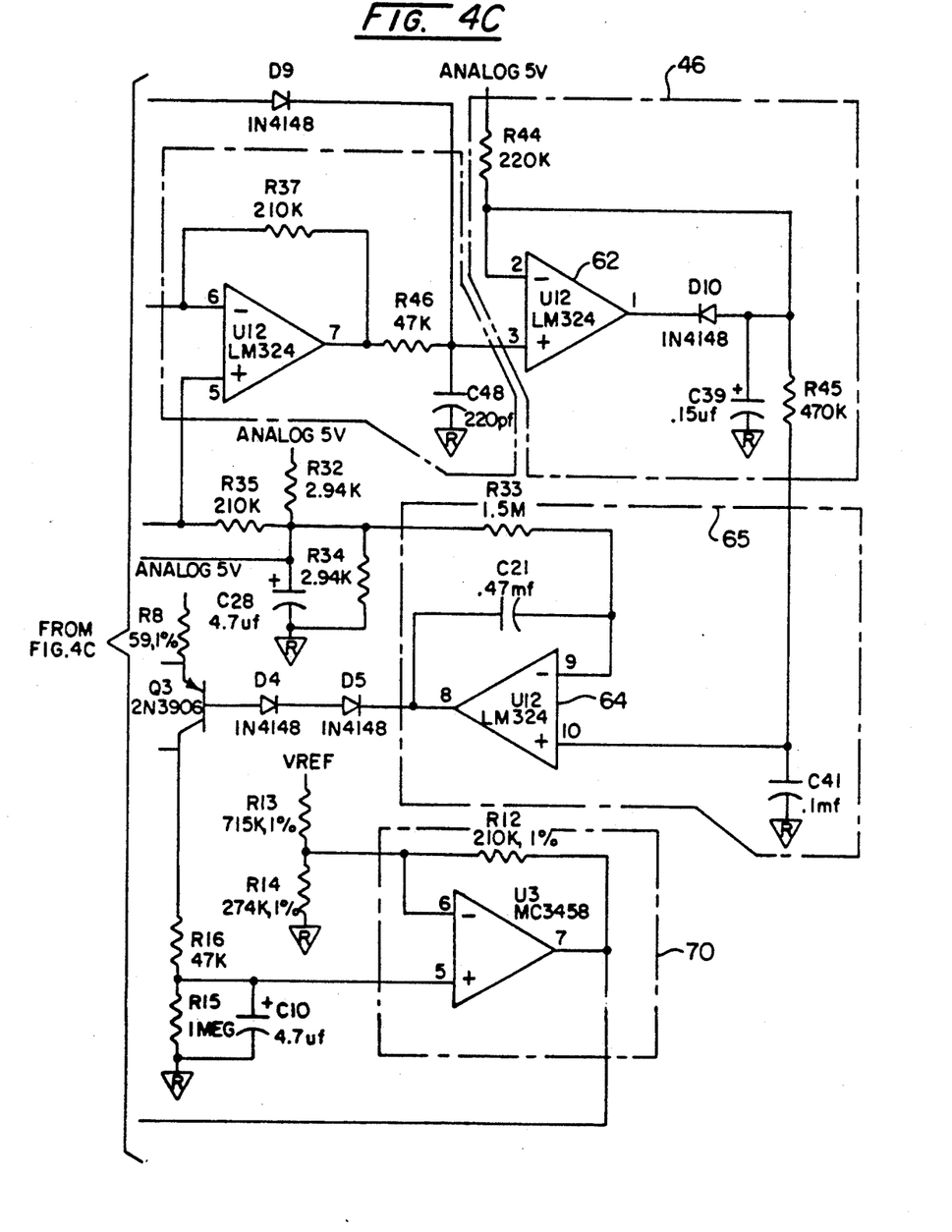

The preferred embodiment of the invention is illustrated in FIGS. 3 and 4A-AC. FIG. 3 is a block diagram illustrating the concepts of the preferred embodiment, while FIG. 4 is a schematic diagram illustrating the details of the preferred embodiment.

FIG. 3 shows thermistors 20 and 22. As known to those skilled in the art, thermistors have an impedance which is a function of their temperature, as do all conductors at conventional operating temperatures. However, thermistors have an inverse temperature coefficient and are not linear.

In the preferred embodiment, the thermistors are heated by a DC current, but their impedance is measured by an AC signal. The DC and AC impedance will be essentially the same because the thermistors exhibit essentially no reactance. The AC signal is obtained from a multivibrator which applies a 2000 Hz square wave to the thermistors 20 and 22. The multivibrator provides a constant voltage source at each output level. This AC square wave signal is applied to thermistor 20 through a DC blocking capacitor 35. Thermistor 20 is also series connected with resistor R41 to form a voltage divider circuit. Similarly, the AC signal is applied from the multivibrator 42 through a DC blocking capacitor C34 to thermistor 22. Thermistor 22 and resistor R40 also provide a voltage divider circuit. As a result of this AC voltage divider connection, the impedance of each of the thermistors is directly proportional to the voltage across each, which voltage consequently is a signal representing the temperature of each thermistor.

The voltage of unheated thermistor 22 is applied through scaling potentiometer R26, to the inverting input of a differential amplifier 44. Similarly, the voltage across thermistor 20 is applied to the non-inverting input of the differential amplifier 44. As a result, the output of differential amplifier 44 is an error signal representing any difference which exists between the voltage across thermistor 20 and the scaled down voltage across thermistor 22. As stated above, a feedback control system is used so that this error signal increases or decreases the current through thermistor 20 to increase or reduce the power applied to thermistor 20 and thereby maintain a substantially constant temperature differential between the thermistor 20 and the thermistor 22.

Of course, in the preferred embodiment there is a substantially constant impedance differential actually maintained which may vary somewhat from a substantially constant temperature to the extent of the non-linearities of the temperature impedance characteristic of the thermistors.

The output of the differential amplifier 44 is a square wave having a peak-to-peak value which is an increasing continuous function of any departure of the differential impedance between the thermistor 20 and the thermistor 22 from the preselected, described differential impedance which was preselected, described positioning of scaling potentiometer R26. Such a departure may be referred to as an error signal. This output is applied to a peak detector, the output of which provides a DC level which is an instantaneous function of the error signal. The output of the peak detector is applied to an integrator so that the signal is integrated with respect to time and in turn applied to a control system amplifier 52 which controls the amount of heating current supplied through the thermistor 20. The integrating circuit provides an integrated error signal to prevent any oscillating feedback through the feedback loop of the control system.

The power supplied to heated thermistor 20 is detected by detecting the current through and the voltage across the thermistor 20. The current is detected by a DC current detector 48 and the voltage is detected by a DC voltage detector 50, connected to the DC current control amplifier 52.

The output of both the DC current detector and the DC voltage detector are applied to an analog to digital converter 54 and in turn applied to the computer 38. Similarly, a temperature signal representing the temperature of the unheated thermistor 22 is detected by a thermistor temperature detector circuit 56 which detects the voltage across the thermistor 22, which approximately is an inversely proportional (though non-linear) function of the impedance of thermistor 22, and applies that temperature signal to the A to D converter 54, which in turn applies it to the computer 38. The DC voltage and DC current signals in digital data format are multiplied in the computer to obtain the power.

FIGS. 4A-4C illustrates the detail of the preferred embodiment of the invention. Referring to FIGS. 4A-4C the multivibrator 60 is connected as illustrated in FIG. 3 to thermistors 20 and 22. Temperature sensing signals are coupled to the differential amplifier 44 as illustrated, the signal from the unheated thermistor 20 being scaled by the potentiometer R26. The output of the differential amplifier 44 is connected to a peak detector consisting of op-amp 62 and its associated diode D10 and capacitor and biasing resistors.

Resistor R46 and capacitor C40 form a low pass filter. The square wave pulses, arriving at the inverting and non-inverting inputs of the differential amplifier 44, not only have different amplitudes representing the different impedances of the two thermistors, but they may also be slightly out of phase or have rise and fall times which are not identical. Consequently, spikes may appear at the intervals of the pulse transitions and any such spikes are filtered out by low pass filter R46 and C40. The output from that low pass filter is therefore a square wave having a peak-to-peak value representing any departure of the impedance differential of the thermistors from the preselected, desired temperature differential.

In order to detect this peak-to-peak value, the non-inverting input of peak detector op-amp 62 is clamped during one-half of each multivibrator cycle by a signal applied through diode D9 to the non-inverting input of op-amp 62. This provides a reference for the peak detector circuit, which includes op-amp 62, to detect the other peak, the amplitude of which will then represent the error signal representing any deviation of the impedance of thermistors 20 and 22 from their selected differential impedance. Thus, it can be seen that the positioning of the potentometer R28 selects the impedance differential for thermistors 20 and 22 which the control system will maintain.

The output from the peak detector circuit is then applied to op-amp 64 which, together with capacitor C21 and C41, form an integrator circuit 65. The integrated error signal is then applied through diodes D4 and D5 to transistor Q3 operating as the control amplifier.

Transistor Q3 has a series emitter resistor R8 which provides a voltage which is directly proportional to the current through thermistor 20. Consequently, R8 is the current detecting resistor, the voltage from which is applied to a voltage scaling circuit 66 and from its output is applied to the A to D converter 68. Similarly, the collector circuit of bipolar transistor Q3 has a pair of series resistors which detect the voltage across the thermistor 20. That thermistor voltage is applied to a scaling circuit 70, the output of which is coupled to the A to D converter 68.

The voltage across thermistor 22 is also applied to a scaling circuit 72 and from its output to the A to D converter 68. All three signals applied to the A to D converter are, in turn, coupled by conventional techniques to the computer. Further components illustrated in FIG. 4A-4C are provided for a conventional biasing and protection purposes.

Thus, in summary, the circuit of FIGS. 4A-4C include a feedback control circuit which maintains a constant impedance differential between thermistors 20 and 22 by controlling the heating current applied to thermistor 20. The circuit also provides signals which represent the voltage across and the current through the heated thermistor 20 and the voltage across thermistor 22. In this circuit the voltage across each thermistor corresponds to the impedance of each thermistor which in turn substantially correspond to the temperature of each thermistor. These signals are then processed by the computer by first multiplying the thermistor 20 voltage and current signals to obtain a signal representing the power in the thermistor 20. The computer then processes that power information for the thermistor 20 and the the temperature of the air flow, to calculate the flow rate in terms of conventional pressure differential.

Because of the non-linearities in the components and because the power signal is a function of not only the flow rate but to a lesser extent is also a function of the air temperature, we have found it advantageous to experimentally derive a polynomial which relates the raw thermistor voltage and current signals obtained from the A to D processor 68 to the flow rate in units of inches of water pressure. The experimentally and empirically derived data is used to derive polynomial equation coefficients which are used as a transfer function for converting the voltage and current signals to the flow rate in inches of water.

Figure 5:
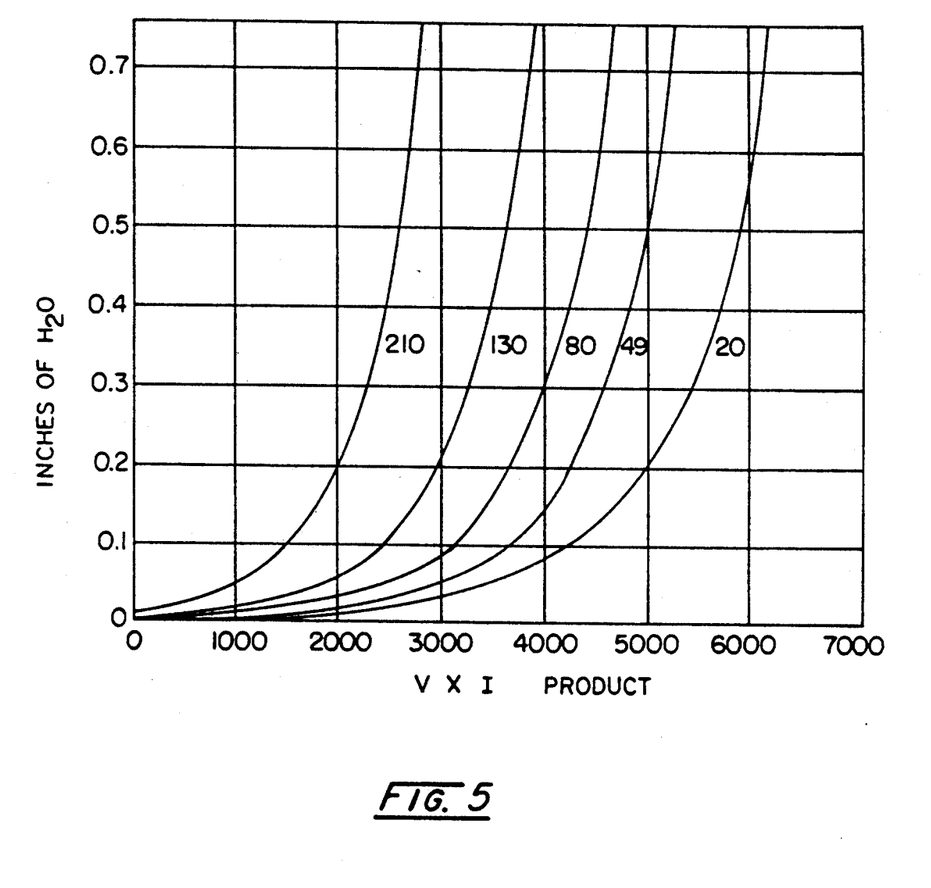
FIG. 5 is a graph illustrating a polynomial function for converting the power related signal representing the power dissipated in the heated thermistor to air flow rate in units of inches of water.

The polynomial is in the form:

I. $F(x) = A + Bx + Cx^2 + Dx^3$ where $F(x)$ = pressure in inches of water $x$ = product of raw voltage and current signals representing power in the heated thermistor A different set of co-efficients, A, B, C, and D, for the polynomial equation were determined for each a series of representative temperatures across the normal operating temperature range of the invention to provide a group of sets of experimentally determined coefficients. The set for each temperature includes a first subset for pressures above a pressure of 0.1 inches of water and a second subset for temperatures below that pressure. The coefficients may be inserted in the polynomial for each temperature and a family of curves plotted, one curve for each temperature. Each curve consists of a lower pressure portion and an upper pressure portion, each portion representing a plot of $F(x)$. The curves in that family are illustrated in FIG. 5.

Consequently, in computing the air flow the computer utilizes the temperature signal from the unheated transistor for selection of the coefficients. In the event that the temperature falls between two curves, the coefficients for the nearest temperature curves on either side of the temperature of the unheated thermistor are used to determine an air flow pressure for each and then an intermediate value of pressure is selected based upon a linear interpolation between the two values corresponding to the position between the two temperatures of the measured temperature.

The coefficients which we have derived are as follows:

| COEFFICIENTS FOR POLYNOMIAL | | | |
|---|---|---|---|
| | | pressure >— | pressure <— |
| raw temp = 20 | A | −1.76218e1 | −7.24343e-2 |
| (123° F.) | B | 5.39667e-3 | 4.70505e-5 |
| | C | −5.51281e-7 | −9.15733e-9 |
| | D | 1.89913e-11 | 7.0126e-13 |
| raw temp = 49 | A | -1.38844e1 | -6.10651e-2 |

| COEFFICIENTS FOR POLYNOMIAL | | | |
|---|---|---|---|
| | | pressure >— | pressure <— |
| (110° F.) | B | 4.97209e-3 | 4.97503e-5 |
| | C | −5.98419e-7 | -1.16362e-8 |
| | D | 2.45249e-11 | 1.05142e-12 |
| raw temp = 80 | A | −4.5524 | -3.50636e-2 |
| (91° F.) | B | 1.99041e-3 | 3.8291e-5 |
| | C | -2.9575e-7 | -9.97051e-9 |
| | D | 1.53588e-11 | 1.14125e-12 |
| raw temp = 130 | A | -6.07239 | -1.85985e-2 |
| (72° F.) | B | 3.03407e-3 | 3.42922e-5 |
| | C | −5.12498e-7 | -1.15245e-8 |
| | D | 3.02227e-11 | 1.79795e-12 |
| raw temp = 130 | A | -0.86683 | -4.10863e-3 |
| (50° F.) | B | 8.04446e-4 | 2.45887e-5 |
| | C | -2.39876e-7 | -5.53483e-9 |
| | D | 2.62171e-11 | 2.74803e-12 |

While certain preferred embodiments of the present invention have been disclosed in detail, it is to be understood that various modifications may be adopted without departing from the spirit of the invention or scope of the following claims.

We claim:

1. An apparatus for detecting a signal which represents the flow velocity of a fluid, the apparatus comprising:
    (a) a pair of thermistors for positioning in a flowing fluid, each thermistor having an impedance which is a function of its temperature;
    (b) means for the variably controlled heating of one of the thermistors;
    (c) an electrical circuit for detecting the temperature of each of the thermistors by detecting signals representing the impedance of the thermistors, the temperature detecting circuit including means for coupling an AC source which generates square wave pulses to each of said thermistors and for detecting AC signals representing said impedance of the thermistors, the temperature detecting circuit more particularly comprising:
        (i) an impedance connected in series with each thermistor to form two series pairs of voltage dividers; and
        (ii) a square wave, constant voltage source connected across said voltage dividers wherein the voltage across each thermistor is proportional to the thermistor's impedance and substantially represents its temperature;
    (d) a negative feedback, closed loop control means having its output connected to said heating means for controlling the thermal power applied to heat the heated thermistor, and having the two temperature outputs of the temperature detecting circuit connected to its reference and feedback summing junction inputs, one of the two temperature outputs being scaled to cause the feedback control circuit to maintain a substantially constant temperature different between said pair of thermistors, the negative feedback closed loop control means more particularly comprising:
        (i) a potentiometer connected to an intermediate node in the voltage divider of the unheated thermistor for scaling its temperature representing voltage;
        (ii) a differential amplifier having one input connected to the scaled potentiometer output and in other input connected to an intermediate voltage divider of the heated thermistor (iii) a pulse peak detector connected to the output of the differential amplifier;

(iv) an integrator circuit connected to the output of the pulse peak detector; and (v) an amplifier circuit connected to supply electrical heating power to said heated thermistor and having its input control terminal connected to the output of said integrator circuit; and (e) means for detecting a signal representing the thermal power supplied to heat the heated thermistor, said thermal power detecting means more particularly comprising an electrical circuit for detecting the voltage across and the current through said heated thermistor and an electrical circuit for multiplying the voltage and current to obtain a power signal representing said thermal power; wherein the thermal signal is an inverse continuous function of and represents the fluid flow velocity.

2. An apparatus in accordance with claim 1 wherein said thermistors are mounted within a fluid conduit having its inlet end positioned in an air duct upstream of its outlet end.

* * * * *